Oct. 9, 1962 A. T. KORNYLAK 3,057,448
GRAVITY TYPE CONVEYOR
Filed April 2, 1959 3 Sheets-Sheet 1

INVENTOR.
Andrew T. Kornylak
BY
Chandlee Pidgeon
AGENT

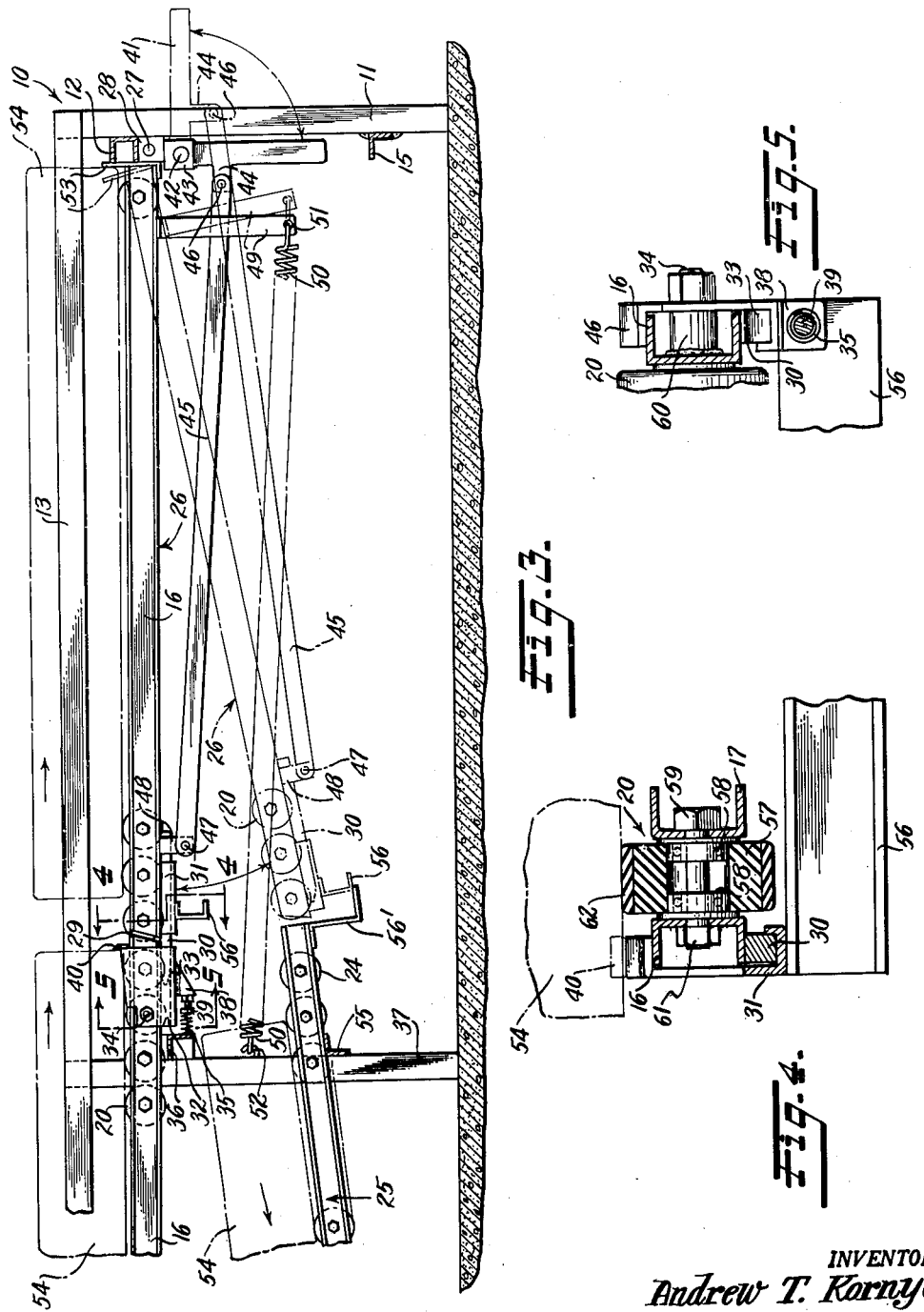

United States Patent Office 3,057,448
Patented Oct. 9, 1962

---

3,057,448
GRAVITY TYPE CONVEYOR
Andrew T. Kornylak, Jersey City, N.J.
(400 Heaton St., Hamilton, Ohio)
Filed Apr. 2, 1959, Ser. No. 803,623
2 Claims. (Cl. 193—36)

This invention relates to a gravity type conveyor, and more particularly to a roller trackway type conveyor which is adapted to handle merchandise in the shipping department of a warehouse. In such departments, merchandise of various types is placed on individual pallets and is located in batches along the length of a shipping room conveyor. An order picker goes from batch to batch picking up items to fill an order and places them on the shipping room conveyor. The loads on these pallets range from around 1000 pounds to around 3000 pounds. The pallets are platforms having runners or skids which elevate the platform from a floor sufficiently to accommodate the fork of a fork lift. Wear and splitting of the wood of the runners causes unevenness which may affect the movement of the pallet on a roller way. This is one of the problems which have been solved by the present invention. This problem involved development of a roller for the trackway which would satisfactorily handle the loads and accommodate for unevenness of the runners of the pallet. Another feature of the invention is the design of a means for returning the empty pallets to the rear of the conveyor with a minimum of manual handling.

In use a plurality of my pallet conveyors are placed in an aisle each being substantially perpendicular to a pick up conveyor and spaced from such conveyor a sufficient distance to permit a picker to move from one to another in selecting merchandise. Each pallet conveyor is supplied with loaded pallets of one kind of merchandise by means of a fork lift which places the pallets on the roller ways at the rear of the conveyor whence they gravitate to the front and are arrested by a stop. When all the merchandise has been removed from a pallet, the rear end of a pivoted front section is lowered and the empty pallet slides downwardly to a return trackway and gravitates to the rear for pick-up by a fork lift.

An object of the invention, therefore, is the provision of a conveyor for handling a plurality of loaded pallets and advancing them toward the pickup point.

Another object of the invention is the provision of means whereby loaded pallets may be placed on the rear of a conveyor and empty pallets returned to the rear for pick-up by a fork truck.

A further object of this invention is the provision of a novel means for returning empty pallets to the rear of the conveyor with a minimum of manual handling.

An additional object of this invention is the provision of a pallet return trackway with means for shifting a section of the main conveyor into alignment therewith.

A still further object of this invention is the provision of a novel conveyor trackway roller which will handle a pallet having runners which may be uneven.

These and other objects will be apparent from a consideration of the following specification taken with the accompanying drawings forming a part thereof.

In the drawings, wherein like parts are indicated by like characters of reference, FIG. 1 is a somewhat diagrammatic plan view of a plurality of my conveyors adjacent a shipping department conveyor;

FIG. 3 is a fragmentary left side view of the front portion substantially on the line 3—3 of FIG. 2, FIG. 4 is a fragmentary view, partly in section, showing the trackway roller construction taken substantially on the line 4—4 of FIG. 3;

FIG. 5 is a fragmentary view showing the locking means for the pivoted section and the movable stop taken substantially on the line 5—5 of FIG. 3;

Figure 1:
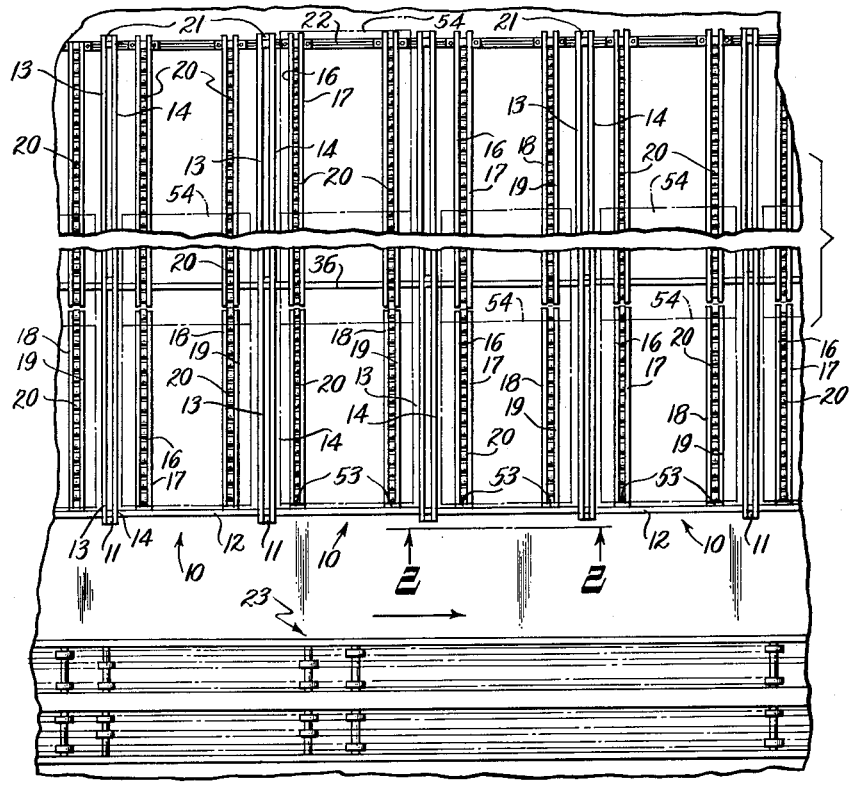
Figure 2:
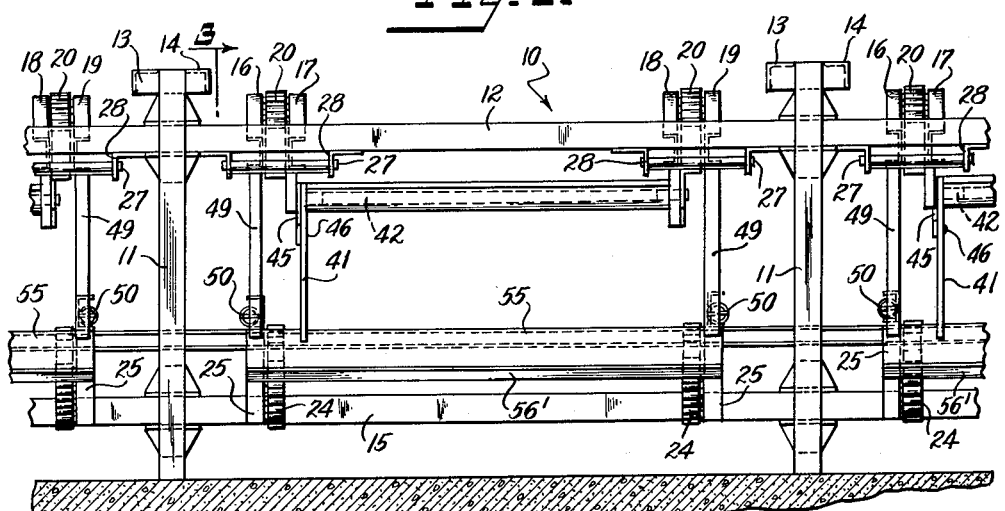
FIG. 2 is a front elevation taken on the line 2—2 of FIG. 1.

Referring now to FIGS. 1 and 2 there is shown a plurality of pallet conveyors 10. Vertical frame members 11 support upper front rails 12, longitudinally extending side rails 13, 14, and lower front rails 15. Intermediate channel members 16, 17 and 18, 19 are arranged in spaced apart pairs. The channel members of each pair, such as 16, 17, are forwardly inclined and they are spaced apart a distance approximately the width of a pallet. Each pair 16, 17 and 18, 19 accommodates a series of trackway rollers 20 therebetween. At the rear of the pallet conveyor are legs 21 and connecting rear frame members 22. The side rails 13 and 14 are connected to the upper ends of the rear legs 21. The bank of pallet conveyors 10 is, for convenience, placed adjacent a conveyor 23, leading to the shipping department.

In FIG. 3 there is shown the means for automatically returning a pallet to the rear for pick up by a lift fork or other suitable means.

Below the rear portion of the trackway comprising the rollers 20, there is a rearwardly inclined series of trackway rollers 24, similar to the series of rollers 20, mounted on channels, such as 25, in a manner similar to the rollers 20. A section 26, of the pallet conveyor 10, of a length sufficient to accommodate a single loaded pallet, is pivoted at 27 on suitable plates 28, only one being shown, affixed to the legs 11. The section 26 confronts the main pallet conveyor at the gap 29, and is locked in position by means of a cam pin 30 mounted in a channel member 31 mounted forwardly of the gap 29, and engaging a channel member 32 rearwardly of the gap 29. The pin 30 is tapered rearweardly and upwardly as at 33.

The channel member 32 is pivoted at its rear, as at 34 on the channel 16. It is to be understood that there are two pins 30, two channel members 31 and two pivoted channel members 32, one on the channel member 16 and one on the channel member 19. The forward end channel member 32 is urged upwardly by means of a compression spring 35, mounted between a transverse frame member 36, mounted on an intermediate leg 37, and an abutment 38 mounted on the underside of the channel member 32. A rod 39 on the abutment 38 holds the spring in position. On the upper surface of the forward end of the pivoted channel member 32 there is formed a tooth 40, normally out of the path of a pallet, but moving into engagement therewith when the channel member 32 is pivoted upwardly.

A handle 41 is mounted on a rockshaft 42 pivoted at 42' near the forward end of the pallet conveyor on a plate 43 affixed to the leg 11. A lug 44 is formed on the handle 41, and a link 45 is pivoted thereto at 46. The link is also pivoted at 47 on a lug 48 mounted on the forward end of the pin 30.

An arm 49 is affixed adjacent the forward end of the channel 16 of the section 26. A spring 50 has one end secured in an opening 51 in the arm 49 and the other end secured to a loop or staple 52 in the leg 37. A stop 53 is placed at the forward end of the section 26 to arrest a pallet 54, shown in dashed lines, resting thereon.

The forward end of the return conveyor channel member 25 is supported by a transverse frame member 55 mounted on the leg 37. An L-shaped member depends from the forward end of the channel 25 and forms a stop for the pivoting section 26, which has a channel member 56 engageable with said L-shaped stop 56', in the lowered position of the section 26.

The operation of the device thus far described will now be set forth. Pallets 54, loaded with merchandise, are placed on the rear of the conveyor 10 by suitable means, such as a fork lift and gravitate to the forward end to be arrested by the stop 53. When the merchandise has been removed from the forward pallet 54, the pickup operator raises the lever 41 to the dotted line position. This operation retracts the pin 30 to release the section 26, and to allow the pivoted channel member 32 to move upwardly so that the tooth 40 engages the next pallet 54. The weight of the pallet 54 on the section 26 is sufficient to overcome the tension of the spring 50 so that the section 26 pivots downwardly as shown in dash lines in FIG. 3. The pallet 54 then rolls onto the rollers 24. When the section 26 is relieved of the weight of the pallet 54 the spring 50 causes it to rise again to normal position. The operator then moves the handle down to the solid line position, and the pin 30 cams the channel member 32 downwardly removing the tooth 40 from engagement with the pallet 54 which moves forwardly to engagement with the stop 53.

It has been found that wear, splitting and other causes make uneven surfaces on the runners of the pallets 54. They would not roll satisfactorily on the ordinary metal rollers. Rubber rollers having cushioned peripheries were tried, but were unsatisfactory. The roller 20 illustrated in FIG. 4 was devised and proved successful. Roller 20 comprises a tubular core 57 of hard rubber or other suitable elastomeric material. A pair of anti-friction bearings 58 are pressed into the core 57. A bolt 59 passes through the suitable openings in the channels 16, 17, the bearings 58 and a boss 60 on the channel 16 at the pivot of channel 32. A nut 61 holds the bolt in position. The core 57 of the roller 20 is provided with a thin tire 62 of softer rubber or other suitable elastomeric material. This tire is preferably made of #60 durometer rubber bonded to the core 57. Though the preferred form for the rollers 20 is as described, I have found that cores of other material, such as steel or cast iron may be used. The use of rollers having the tire 62 handled loaded pallets which were in such condition that they would not roll satisfactorily over steel or other rollers. It is, therefore, believed that this roller 20 is a very important feature of my invention.

While the rollers 24 may be of the same construction as the rollers 20, they need not be so, as other rollers, even skate rollers can handle the empty pallets.

The pivoted channel members 32, cooperating with the cam pins 30 are preferably allochirally arranged as are the channel members 16, 17 and 18, 19.

Figure 6:
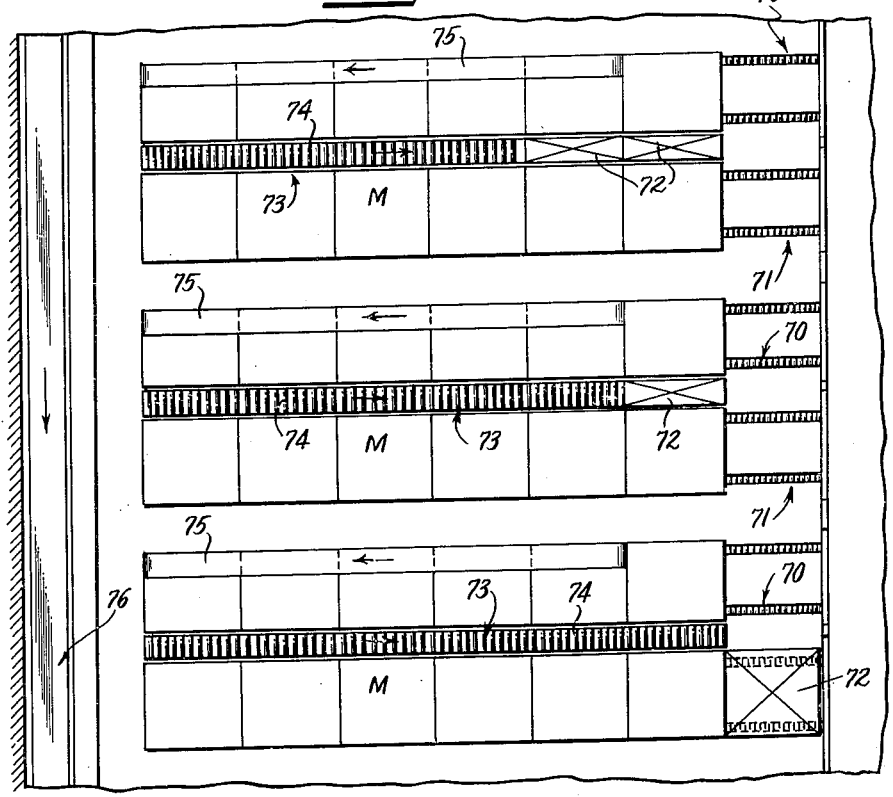
FIG. 6 is a diagrammatic plan view of a conveyor system with a modified form of pallet return.
Figure 7:
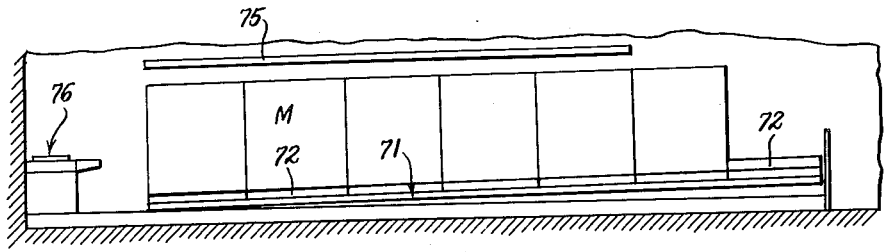
FIG. 7 is a side elevation of the same.

In FIGS. 6 and 7 I show a modified form of pallet return conveyor. A pair of conveyors 70, 71 are arranged parallel to each other in spaced relation and support pallets 72 loaded with merchandise M. As these pallet conveyors may be similar in construction to the pallet conveyors illustrated in FIGS. 1 to 3, no detailed description thereof is given. The novel feature of this modification is the rearwardly inclined pallet return conveyor 73 located between pallet conveyors 70 and 71. This conveyor comprises a plurality of rollers 74 of a length to accommodate a pallet turned up on its side. Over several of the loaded pallets on the pallet conveyor is a gravity pick-up conveyor 75. Merchandise M from the pallet conveyors 70, 71 is placed on the conveyors 75 and carried toward the forward end thereof. From this conveyor 75, articles are placed on the shipping room conveyor 76, which may be one of a number of known gravity type conveyors.

When a pallet 72 is emptied, it is turned up on its side and placed on the conveyor 73 whereon it rolls to the rear. The pallets may be removed at this point and stacked at the rear of the loaded pallets as shown in FIG. 7. The rollers forming the trackways of pallet conveyors 70, 71 may be the same as the rollers 20 and 24 of FIGS. 1 to 5 though other rollers may be used.

It is to be understood that the various modifications may be made within the skill of the art and the scope of the appended claims.

I claim:

1. A conveyor system for forwarding loaded pallets and returning empty pallets comprising upper slightly forwardly inclined laterally spaced roller ways, including a fixed main section and a pivoted section located adjacent the forward end of the fixed section, and laterally spaced rearwardly inclined fixed lower roller ways terminating in a vertical plane adjacent the forward end of said fixed main section of the upper roller ways, said pivoted section being pivoted at the forward end thereof, releasable locking means for said pivoted section whereby when said means is released said pivoted section is movable between the upper and lower roller ways whereby a loaded pallet may be received and unloaded on said pivoted section at the forward end of the upper roller ways and the empty pallet returned over the lower roller ways, spring urged means at the forward end of the fixed portion of the upper roller ways to hold a second pallet while a first pallet is on said pivoted section, and manually operated means for releasing said second pallet, spring means urging said pivoted section into engagement with said fixed section.

2. The structure as defined in claim 1 wherein the roller ways include a plurality of closely spaced rollers, and wherein the rollers have a core of hard elastomeric material and a tire of elastomeric material of less hardness bonded thereto.

References Cited in the file of this patent

UNITED STATES PATENTS

| | | |
|---|---|---|
| 1,969,276 | Pevear | Aug. 7, 1934 |
| 2,466,650 | Walker et al. | Apr. 5, 1949 |
| 2,592,581 | Lorig | Apr. 15, 1952 |
| 2,662,651 | Anderson | Dec. 15, 1953 |
| 2,864,516 | Rogers | Dec. 16, 1958 |